(12) United States Patent
Sakatani

(10) Patent No.: US 10,097,734 B2
(45) Date of Patent: Oct. 9, 2018

(54) IMAGE FORMING APPARATUS FOR MONITORING AND ADJUSTING GRADATION CHARACTERISTICS

(71) Applicant: Konica Minolta, Inc., Chiyoda-ku, Tokyo (JP)

(72) Inventor: Kazuomi Sakatani, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/208,650

(22) Filed: Jul. 13, 2016

(65) Prior Publication Data
US 2017/0041510 A1 Feb. 9, 2017

(30) Foreign Application Priority Data

Aug. 5, 2015 (JP) .................. 2015-154694

(51) Int. Cl.
*H04N 1/00* (2006.01)
*H04N 1/407* (2006.01)
(Continued)

(52) U.S. Cl.
CPC ......... *H04N 1/6027* (2013.01); *G06K 15/027* (2013.01); *G06K 15/1878* (2013.01);
(Continued)

(58) Field of Classification Search
CPC .......... H04N 1/00002–1/0009; H04N 1/603–1/6055; H04N 1/23–1/2392;
(Continued)

(56) References Cited

U.S. PATENT DOCUMENTS 5,828,461 A * 10/1998 Kubo .................. H04N 1/6011
358/302
5,950,036 A * 9/1999 Konishi ................ G06K 15/00
399/11

(Continued)

FOREIGN PATENT DOCUMENTS

| CN | 101887222 A | 11/2010 |
| JP | 2006-091179 A | 4/2006 |
| JP | 2014-107648 A | 6/2014 |

OTHER PUBLICATIONS

Extended European Search Report dated Dec. 5, 2016 issued in corresponding European Patent Appln. No. 16177677.8 (9 pages).
(Continued)

*Primary Examiner* — Scott A Rogers
(74) *Attorney, Agent, or Firm* — Buchanan Ingersoll & Rooney PC

(57) ABSTRACT

An image forming apparatus includes an image forming device, a gradation adjustment mark adder and a hardware processor. The hardware processor monitors and adjusts a gradation characteristic based on a result of scanning a gradation adjustment mark. The hardware processor makes a determination as to whether to form the gradation adjustment mark overlapping an image area of an image based on image data. If it is determined to form the gradation adjustment mark overlapping the image area, the hardware processor controls the gradation adjustment mark adder to add gradation adjustment mark information to the image data in the image area.

12 Claims, 8 Drawing Sheets

(51) Int. Cl.
| | |
|---|---|
| *H04N 1/60* | (2006.01) |
| *H04N 1/23* | (2006.01) |
| *G06K 15/02* | (2006.01) |
| *H04N 1/32* | (2006.01) |
| *H04N 1/40* | (2006.01) |
| *H04N 1/29* | (2006.01) |
| *G03G 15/00* | (2006.01) |

(52) U.S. Cl.
CPC ..... *G06K 15/1889* (2013.01); *H04N 1/00005* (2013.01); *H04N 1/00015* (2013.01); *H04N 1/00023* (2013.01); *H04N 1/00042* (2013.01); *H04N 1/00045* (2013.01); *H04N 1/00082* (2013.01); *H04N 1/233* (2013.01); *H04N 1/2315* (2013.01); *H04N 1/2338* (2013.01); *H04N 1/2392* (2013.01); *H04N 1/32106* (2013.01); *H04N 1/40056* (2013.01); *H04N 1/4078* (2013.01); *H04N 1/6033* (2013.01); *H04N 1/6044* (2013.01); *G03G 15/502* (2013.01); *G03G 15/5062* (2013.01); *G03G 2215/00063* (2013.01); *G03G 2215/00067* (2013.01); *G03G 2215/00569* (2013.01); *H04N 1/29* (2013.01); *H04N 2201/0082* (2013.01); *H04N 2201/3201* (2013.01); *H04N 2201/3259* (2013.01)

(58) Field of Classification Search
CPC .......... H04N 1/29; H04N 1/40; H04N 1/407–1/4078; G06K 15/027; G06K 15/1889; G06K 15/1878
See application file for complete search history.

(56) References Cited

U.S. PATENT DOCUMENTS

| | | | | | |
|---|---|---|---|---|---|
| 6,148,168 | A * | 11/2000 | Hirai | ................. | G03G 15/0194 399/231 |
| 8,259,351 | B2 * | 9/2012 | Kuwahara | ............. | B41J 29/393 358/1.18 |
| 8,358,440 | B2 * | 1/2013 | Ernst | .................... | H04N 1/6097 358/1.9 |
| 8,610,932 | B2 * | 12/2013 | Niles | ..................... | G06F 3/1229 358/1.15 |
| 8,625,179 | B2 * | 1/2014 | Sakatani | .................. | H04N 1/60 358/504 |
| 8,687,251 | B2 * | 4/2014 | Ishii | ..................... | H04N 1/6033 358/1.9 |
| 8,842,323 | B2 * | 9/2014 | Krom | .................... | G06K 15/02 358/1.15 |
| 8,964,246 | B2 * | 2/2015 | Sakatani | ............ | G03G 15/0131 345/590 |
| 9,057,977 | B2 * | 6/2015 | Kubo | ................. | G03G 15/0266 |
| 9,091,988 | B2 * | 7/2015 | Nakase | .............. | G03G 15/5037 |
| 9,239,976 | B2 * | 1/2016 | Yano | .................. | G06K 15/4065 |
| 2006/0140650 | A1 * | 6/2006 | Yokote | ................. | G03G 15/167 399/27 |
| 2008/0131152 | A1 | 6/2008 | Komiya | | |
| 2009/0087208 | A1 * | 4/2009 | Ogasawara | ............ | G03G 15/36 399/82 |
| 2009/0231605 | A1 | 9/2009 | Kuwahara | | |
| 2010/0054775 | A1 * | 3/2010 | Nakase | .............. | G03G 15/5037 399/49 |
| 2010/0290800 | A1 | 11/2010 | Akiyama | | |
| 2015/0185675 | A1 | 7/2015 | Tamura | | |
| 2017/0038717 | A1 * | 2/2017 | Oki | ........ | G03G 15/50 |
| 2017/0171420 | A1 * | 6/2017 | Okayama | ............... | H04N 1/086 |

OTHER PUBLICATIONS

Office Action (Notice of Reasons for Rejection) dated Sep. 26, 2017, by the Japanese Patent Office in corresponding Japanese Patent Application No. 2015-154694, and an English Translation of the Office Action. (10 pages).

European Office Action dated Jan. 2, 2018 issued by the European Patent Office in corresponding European Patent Application No. 16177677.8 (5 Pages).

Chinese Office Action dated May 31, 2018 issued by the State Intellectual Property Office of the People's Republic of China in corresponding Chinese Application No. 201610622787.4 with English language translation (15 pages).

Office Action (Communication pursuant to Article 94(3) EPC) dated Jul. 19, 2018, by the European Patent Office in corresponding European Application No. 16 177 677.8-1022. (5 pages).

* cited by examiner

IMAGE FORMING APPARATUS FOR MONITORING AND ADJUSTING GRADATION CHARACTERISTICS

BACKGROUND OF THE INVENTION

1. Field of the Invention

The present invention relates to an image forming apparatus.

2. Description of Related Art

Typical electrophotographic image forming apparatuses correct the gradation characteristic of image data so that the gradation characteristic of the image agrees with a target gradation characteristic. To correct the gradation characteristic, a gradation correction table is used in which corrected gradation levels are specified for respective gradation levels.

Since the gradation characteristic of an image changes along with a change in environment and a lapse of time, image forming systems periodically adjusts (calibrates) the gradation characteristic so as to optimize the gradation correction table. The calibration process involves forming a gradation adjustment mark on a sheet, reading the image of the gradation adjustment mark by means of a scanner or the like, and newly forming or updating the gradation correction table based on the difference between the gradation characteristic specified from the read gradation adjustment mark and the target gradation characteristic.

For example, such gradation adjustment marks are formed in a non-image area, which is out of an image area where the image of a job is formed (e.g. see JP 2014-107648A). This eliminates the need for forming a gradation adjustment mark on another sheet other than the sheet on which a user required image is formed. Therefore, it is not required to interrupt an ongoing job, and a waste paper is not produced.

SUMMARY OF THE INVENTION

However, since the above-described conventional technique is to form a gradation adjustment mark in a non-image area, it is impossible to form the gradation adjustment mark when there is no non-image area or the size of the non-image area is small. This substantially limits chances to monitor and adjust the gradation characteristic, and it is sometimes impossible to continuously output correct colors for a long period.

It is an object of the present invention to provide an image forming apparatus that can monitor and adjust the gradation characteristic at a higher frequency and can thereby output correct colors for a long period.

In order to realize the above object, according to one aspect of the present invention, there is provided an image forming apparatus, including:

an image forming device which forms an image on a sheet based on image data;

a gradation adjustment mark adder which adds gradation adjustment mark information to the image data so that a gradation adjustment mark is formed in addition to the image based on the image data; and a hardware processor which monitors and adjusts a gradation characteristic based on a result of scanning the gradation adjustment mark, in which a scanning section which reads the image formed on the sheet scans the gradation adjustment mark, wherein the hardware processor makes a determination as to whether to form the gradation adjustment mark overlapping an image area of the image based on the image data, and if it is determined to form the gradation adjustment mark overlapping the image area, the hardware processor controls the gradation adjustment mark adder to add the gradation adjustment mark information to the image data in the image area.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

Hereinafter, embodiments for carrying out the present invention will be described with the drawings. While the following embodiments include a variety of limitations that are technically preferred for carrying out the present invention, it is not intended that the scope of the present invention is limited to the following embodiments and illustrated examples.

Figure 1:
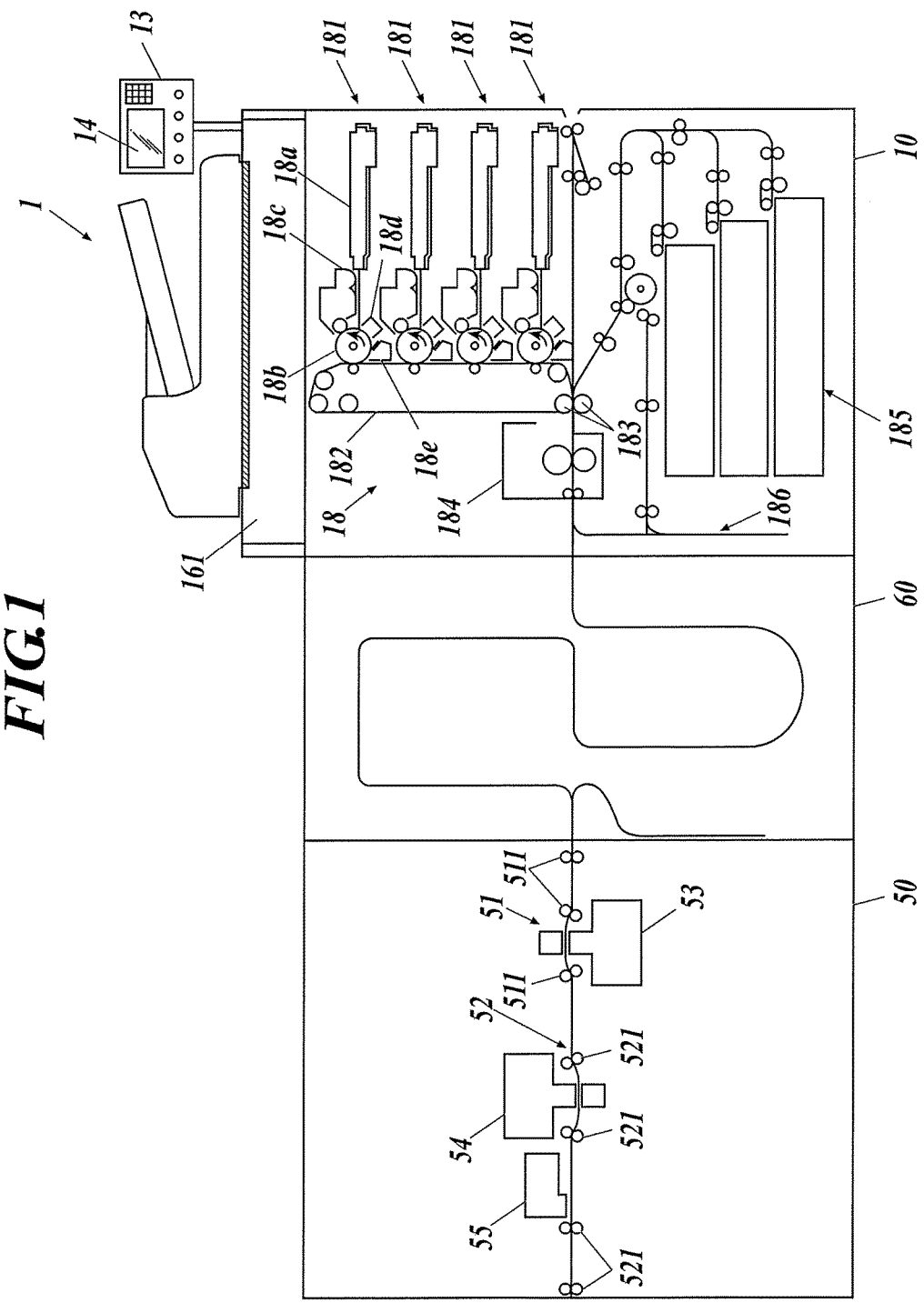
FIG. 1 is a schematic view of an image forming system according to the present invention, illustrating the overall configuration thereof.
Figure 2:
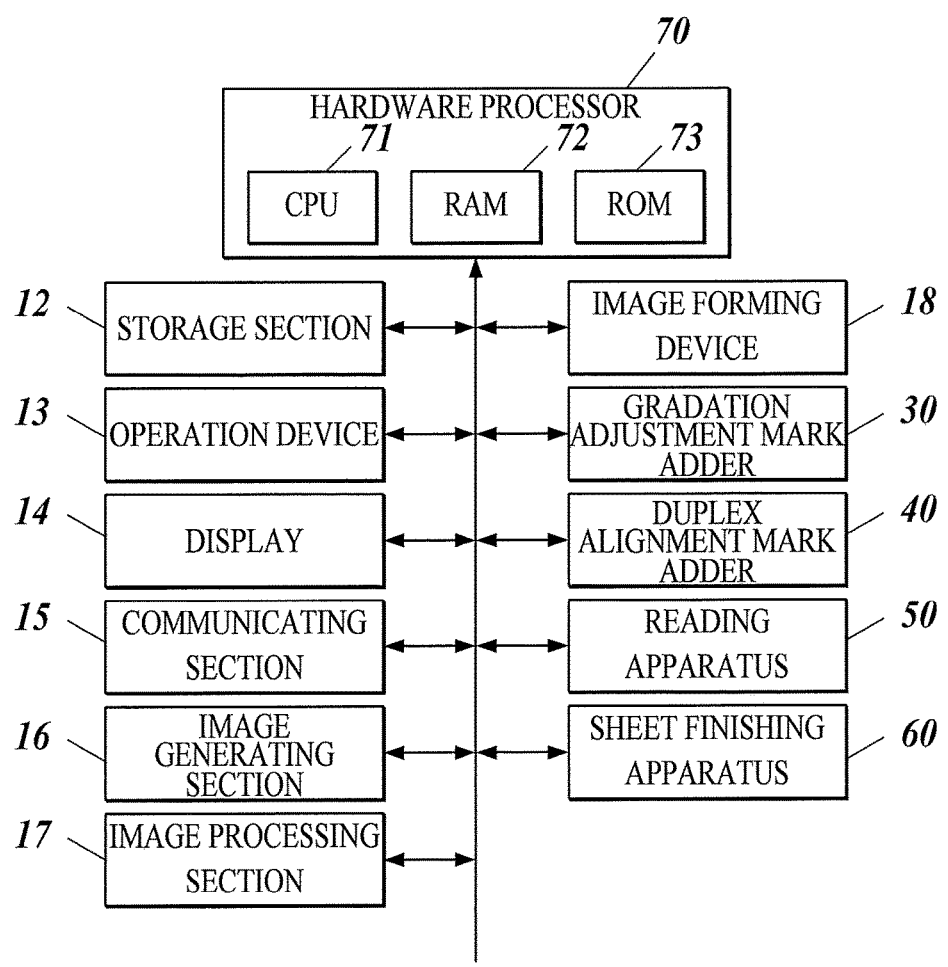
FIG. 2 is a block diagram of an operation control of the image forming system of FIG. 1, illustrating the main configuration thereof.

FIG. 1 is a schematic view of an image forming system 1 according to this embodiment, illustrating the overall configuration thereof. FIG. 2 is a block diagram of an operation control of the image forming system 1, illustrating the main configuration thereof.

As illustrated in FIG. 1 and FIG. 2, the image forming system 1 includes an image forming apparatus 10, a reading apparatus (scanning section) 50, a sheet finishing apparatus 60 and the like.

Hereinafter, the components of the image forming system 1 of the present invention will be individually described.

First, an image forming apparatus 10 will be described.

The image forming apparatus 10 of the present invention makes a determination as to whether to form gradation adjustment marks overlapping the image area of an image to be formed on a sheet. If it is determined that the gradation adjustment marks are formed overlapping the image area, gradation adjustment mark information is added to the image data so that the gradation adjustment marks are formed. Further, the image forming apparatus 10 monitors and adjusts the gradation characteristic based on the result of scanning the sheet on which the gradation adjustment mark is formed.

For example, the image forming apparatus 10 includes a storage section 12, an operation device 13, a display 14, a communicating section 15, an image generating section 16, an image processing section 17, an image forming device 18, a gradation adjustment mark adder 30, a duplex alignment mark adder 40, a hardware processor 70 and the like.

The storage section 12 stores a program readable by the hardware processor 70, a file used in executing the program and the like. The storage section 12 also stores a value that is calculated or obtained in the monitoring and adjustment of the gradation characteristic or in a duplex alignment, which are described below.

The storage section 12 may be constituted by a high-capacity memory such as a hard disk drive.

The operation device 13 generates an operation signal according to a user operation and outputs it to the hardware processor 70. The operation device 13 is constituted by, for example, keys, a touch panel integrally formed with the display 14 or the like. For example, the operation device 13 is used when a user selects whether to form the gradation adjustment marks or duplex alignment marks and when a user selects whether to form the gradation adjustment marks overlapping the image area of an image.

The display 14 displays an operation screen and the like according to a control of the hardware processor 70. The display 14 may be constituted by an LCD (liquid crystal display), an OLED (organic electro luminescence display) or the like. As described below, the display 14 can display the forming position of an image and the forming positions of the gradation adjustment marks 85 on a sheet 80.

The communicating section 15 communicates with an external device in the network such as a user terminal, a server and another image forming apparatus.

For example, the communicating section 15 receives a data in the form of a page description language (PDL) (hereinafter referred to as a PDL data) from a user terminal through a network.

The image generating section 16 rasterizes the PDL data received from the communicating section 15 and generates a bitmap image data with respect to each color of C (cyan), M (magenta), Y (yellow) and K (black), which contains the gradation level of each pixel. A gradation level is a data value that represents the density of an image. For example, an 8-bit data value represents a density level of from 0 to 255.

As illustrated in FIG. 1, the image forming apparatus 10 includes an image reading section 161 for copying. The image forming apparatus 10 can also generate respective image data of R, G and B colors by reading the image of a user-mounted original by means of the image reading section 161.

The image data are generated from a data received by the communicating section 15 or an image read by the image reading section 161.

The image processing section 17 performs image processing such as color correction processing and halftone processing on the image data generated by the image generating section 16. Further, the image processing section 17 can perform color conversion on the image data of R (red), G (green) and B (blue) colors generated by the image reading section 161 so as to generate respective image data of C, M, Y and K colors.

The color correction processing is to convert the respective gradation levels of C, M, Y and K colors to respective corrected gradation levels of C, M, Y and K colors so that the colors in the image formed on a sheet agree with target colors. In the color correction processing, a gradation correction table is used in which output gradation levels are specified for respective input gradation levels. Further, the image processing section performs the color correction processing on the gradation adjustment marks 85 when the hardware processor activates the correction. It does not perform the color correction processing but performs the halftone processing on the gradation adjustment marks 85 when the hardware processor 70 inactivates the correction.

The halftone processing is, for example, error diffusion, screening by ordered dithering or the like.

The image forming device 18 forms a multicolor image on a sheet based on the gradation levels of each pixel in the image data that have been subjected to the image processing by the image processing section 17. In the present invention, the image forming device 18 forms an image on a sheet based on the image data that additionally contain gradation adjustment mark information and duplex alignment mark information, which will be described later. The image is formed in the center of the sheet.

As illustrated in FIG. 1, the image forming device includes four writing units 181, an intermediate transfer belt 182, secondary transfer rollers 183, a fixing device 184, a sheet feeding trays 185 and a flipping mechanism 186. The writing units 181 are arranged in series along the belt surface of the intermediate transfer belt 182. The intermediate transfer belt 182 is supported and driven by rollers. One of these rollers serves as one of the secondary transfer rollers 183. The secondary transfer rollers 183 and the fixing device 184 are arranged in a conveyance path of a sheet conveyed from the sheet feeding trays 185. The sheet feeding trays 185 store sheets.

The four writing units 181 form respective color images of C, M, Y and K colors. Each of the writing units 181 has the same configuration and includes an exposing section 18a, a photoreceptor 18b, a developing section 18c, a charging section 18d and a cleaning section 18e.

Each of the writing units 181 applies a voltage to the photoreceptor 18b to charge it by means of the charging section 18d and thereafter emits a laser beam by means of the exposing section 18a according to the gradation level of each pixel in the C, M, Y or K color image, so as to expose the photoreceptor 18b. Each of the writing units 181 feeds color material such as toner by means of the developing section 18c so as to develop an electrostatic latent image formed on the photoreceptor 18b. The respective color images are thus formed on the photoreceptors 18b of the writing units 181.

The images on the photoreceptors 18b are sequentially transferred and overlaid on the intermediate transfer belt 182 so that a multicolor image is formed on the intermediate transfer belt 182. After transferring the images, the writing units 181 remove the residual color material left on the photoreceptors 18b after the transfer by means of the cleaning sections 18e.

A sheet is fed from the sheet feeding trays 185, the secondary transfer rollers 183 transfer the multicolor image from the intermediate transfer belt 182 to the sheet, and the fixing device 184 then heats and presses the sheet so as to fix the image on the sheet. When images are formed on both sides of the sheet, the flipping mechanism 186 flips over the sheet, and the flipped sheet is conveyed to the secondary transfer rollers 183 again.

The gradation adjustment mark adder 30 is a hardware processor, such as an ASIC (application specific integrated circuit), and adds the gradation adjustment mark information to image data so that the gradation adjustment marks 85 are formed in addition to the image based on the image data.

Figure 3:
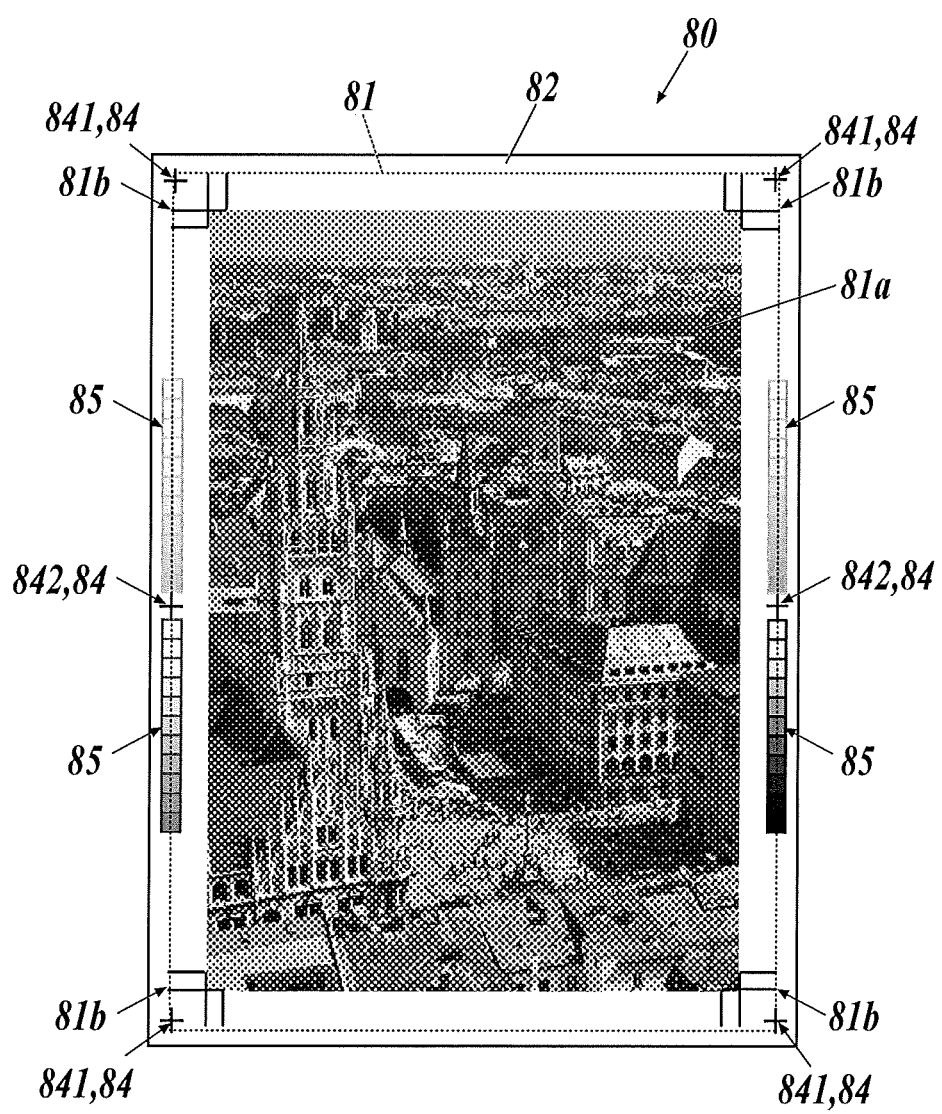
FIG. 3 illustrates one side of a sheet on which an image is formed.

FIG. 3 illustrates one side of a sheet 80 on which the gradation adjustment marks 85 and the duplex alignment marks 84 are formed in addition to an image. In the example of FIG. 3, the illustrated side of the sheet 80 is composed of an image area 81 in which the image of a job is formed and a non-image area 82 between the image area 81 and the edges of the sheet 80. The image area 81 is the area surrounded by the dotted line in FIG. 3, which includes an image portion 81a in which a user required image is formed and trim marks 81b that are provided around the image portion 81a by the user beforehand. The trim marks 81b, each of which is overlapped two L marks, are formed near the four corners of the image portion 81a. The portion surrounded by the four trim marks 81b defines the trimming position of the sheet 80.

The dotted line in FIG. 3 indicating the image area 81 is depicted for descriptive reasons and is not actually formed on the sheet 80. The sheet 80 illustrated in FIG. 3 is conveyed in the longitudinal direction of the sheet 80.

As illustrated in FIG. 3, the gradation adjustment marks 85 are formed respectively for C, M, Y and K colors on one side of the sheet 80. The gradation adjustment marks 85 are normally formed in the peripheral non-image area 82 so that they do not overlap with the image area 81. However, when the hardware processor 70 determines to form the gradation adjustment marks 85 overlapping the image area 81, they are formed overlapping the image area 81. As used herein, the phrase "overlapping the image area 81" encompasses not only overlapping only the image area 81 but also being formed across the image area 81 and the non-image area 82.

The gradation adjustment marks 85 may be formed anywhere in the margin of the sheet 80 (the outside of the image portion 81a). As illustrated in FIG. 3, it is preferred that they are formed in both ends of the sheet 80 in the direction (transverse direction of the sheet 80) perpendicular to the conveyance direction (longitudinal direction of the sheet 80) of the sheet 80. That is, two of the gradation adjustment marks 85 of C, M, Y and K colors are formed in one end in the transverse direction of the sheet 80, and the other two gradation adjustment marks 85 are formed in the other end in the transverse direction of the sheet 80. That is, none of the gradation adjustment marks 85 is formed in the front end in the conveyance direction of the sheet 80. This makes it more reliable to prevent the sheet 80 from being winded in the fixing step.

It is preferred that the gradation adjustment marks 85 are formed in the center part rather than both ends in the conveyance direction of the sheet 80. In particular, it is preferred that the gradation adjustment marks 85 are formed at the inner side (central side) of the both edges in the conveying direction of the image portion 81a. This can prevent the gradation adjustment marks 85 from overlapping the trim marks 81b or the duplex alignment marks 84.

Each of the gradation adjustment marks 85 is composed of gradation patches with gradually different gradation levels of C, M, Y or K. In the illustrated example, eleven gradation patches are formed for each color. The gradation patches, each of which has a square shape with approximately 7.5 mm sides for example, are aligned in the conveyance direction of the sheet 80 with respect to each color. When the density gradation level of a certain color of a pixel is represented by a value from 0 to 255, the density gradation level of the aligned gradation patches of each gradation adjustment mark 85 is selected from the values from 0 to 255 such that the difference in density gradation level between any adjacent two gradation patches is equal, and the gradation patches at both ends respectively have density gradation levels of 0 and 255.

The gradation patches of the gradation adjustment marks 85 may be formed not only for each of C, M, Y and K colors but also for each of R, G and B colors or for process Bk.

The duplex alignment mark adder 40 adds duplex alignment mark information to image data so that the duplex alignment marks 84 are formed on both sides of a sheet in addition to the image based on the image data.

Duplex alignment marks 84 are formed on each side of the sheet 80. Specifically, each of the duplex alignment marks 84 is, for example, crisscrossed two lines with a length of approximately 7.5 mm. In order to reduce erroneous winding of the sheet 80 during the image fixing step, the image forming apparatus 10 is configured such that no image is formed in the area within 2 mm from the edge of a sheet 80. Accordingly, the duplex alignment marks 84 are formed at a distance of 2 mm from the edge of the sheet 80. The area where no image is formed, which is within 2 mm from the edge of the sheet 80, may be changed according to a user operation. When the distance from the edge of the sheet 80 is set to greater than 2 mm, the duplex alignment marks 84 to be formed are partly lacked in the end parts near the edge of the sheet 80.

As illustrated in FIG. 3, the duplex alignment marks 84 on each side of the sheet 80 are constituted by four duplex alignment marks 841 that are formed on each side of the sheet 80 at four locations near the four corners of the sheet 80 and two duplex alignment marks 842 that are formed at two locations in the center in the conveyance direction of the sheet 80 across the image area 81.

The duplex alignment marks 84 are arranged with reference to the edge of the sheet 80 and are formed at a predetermined distance from the edge. As illustrated in FIG. 3, they may be formed overlapping the image area 81 or may be formed in the non-image area 82 without overlapping the image area 81. As with the gradation adjustment marks 85, the duplex alignment marks 84 may be formed such that they overlap the image area 81 only when the hardware processor 70 determines to form them overlapping the image area 81.

The hardware processor 70, which is connected to the components of the image forming system 1 as illustrated in FIG. 2, controls the components of the image forming system 1. The hardware processor 70 includes a CPU 71, a RAM 72, a ROM 73 and the like. The CPU 71 reads out programs and data from a storage device such as the ROM 73 and executes them according to required processing, so as to control the components of the image forming system 1 according to the executed processing. The RAM 72 temporary stores programs, data and the like that are processed in the CPU 71. The ROM 73 stores programs, data and the like that have been read out by the CPU 71 or the like.

The hardware processor 70 monitors and adjusts the gradation characteristic of an image formed by the image forming device 18.

That is, after the initial adjustment of the color correction processing of the image processing section 17, the hardware processor 70 controls the image forming device 18 to form the gradation adjustment marks 85 along with the image on n (n being an integer of 1 or more) sheets 80. The hardware processor 70 controls the reading apparatus 50 to read the gradation adjustment marks 85 of the n sheets 80 and then calculates adjustment values of the gradation characteristic. Thereafter, the hardware processor 70 forms the image on the n+1th and subsequent sheets 80. Simultaneously, the gradation adjustment marks are formed while the correction using the gradation correction table based on the calculated adjustment values is alternated between active and inactive. At the same time, the hardware processor 70 alternately monitors and adjusts the gradation characteristic in every sheet 80. Regarding the image data of a job, the hardware processor 70 always correct the gradation by keeping the correction using the gradation correction table active.

To monitor the gradation characteristic, the hardware processor 70 forms the gradation adjustment marks while the correction using the gradation correction table is active. The hardware processor 70 then controls the reading apparatus 50 to read the formed gradation adjustment marks 85 so as to obtain measured values of the density.

To adjust the gradation characteristic, the hardware processor 70 forms the gradation adjustment marks 85 while the correction using the gradation correction table is inactive. The hardware processor 70 then controls the reading apparatus 50 to read the formed gradation adjustment marks 85 so as to obtain measured values of the density. The hardware processor 70 calculates the adjustment values from the measured values of the latest x sheets 80 (x being an integer of 1 or more) that are printed while the gradation correction is inactive. The hardware processor 70 then makes a new gradation correction table from the adjustment values and updates the gradation correction table at a suitable time.

Further, the hardware processor 70 classifies the measured values obtained in the monitoring and adjustment of the gradation characteristic according to active/inactive of the gradation correction and saves them to the storage section 12.

The hardware processor 70 may control the image forming device 18 to form a predetermined additional image on a sheet 80 in addition to the gradation adjustment marks 85 either in monitoring the gradation characteristic or in adjusting the gradation characteristic. Such additional images that can be used include marks such as open and solid circles and polygons. Forming the additional image allows the user to figure out whether the gradation adjustment marks 85 on the sheet 80 are formed during the monitoring of the gradation characteristic or during the adjustment of the gradation characteristic. Accordingly, the user can check the density both when the gradation correction is active and inactive.

Alternatively, the hardware processor 70 may control the image forming device 18 to form a predetermined additional image on a sheet 80 both in monitoring the gradation characteristic and in adjusting the gradation characteristic. In this case, the attribute of the additional image differs between in the monitoring of the gradation characteristic and in the adjustment of the gradation characteristic. Such attributes of the additional image include the shape, the color, the size and the like of the additional image. It is only required that the difference in attribute is recognizable by the user who checks the additional image on the sheet 80.

The hardware processor 70 may switch active/inactive of the above-described monitoring and adjustment of the gradation characteristic with respect to each image forming job or each sheet tray.

The hardware processor 70 can also perform the duplex alignment to adjust the position of the images that are formed on both sides of the sheet 80 by the image forming device 18.

That is, after the initial duplex alignment of the image processing section 17, the hardware processor 70 controls the image forming device 18 to form the duplex alignment marks 84 on n sheets 80 (n being an integer of 1 or more) in addition to an image. The hardware processor controls the reading apparatus 50 to read the duplex alignment marks 84 on the n sheets 80. The hardware processor 70 then calculates the deviation of the duplex alignment marks 84 from a designed position with respect to each of the sheets 80 and calculates the average of the deviation. When the number of sheets 80 is less than n, the average is calculated only from the available calculated deviations. Subsequently, the hardware processor 70 aligns the image forming positions on both sides of the sheet 80 based on the calculated average at a suitable time and forms images on the n+1th sheet 80. Further, the hardware processor 70 saves the calculated average in the storage section 12.

The values that are calculated or obtained in the above-described monitoring and adjustment of the gradation characteristic and the duplex alignment can be checked from a user terminal.

After a job is finished, the hardware processor 70 can retrieve the values that are calculated or obtained in the monitoring and adjustment of the gradation characteristic and the duplex alignment from the storage section 12, and generate a report of the monitoring and adjustment of the gradation characteristic or the duplex alignment by using the retrieved measured values.

It is preferred that the hardware processor 70 statistically collects the measured values and generates a report that includes the statistical result as well as the gradation characteristic. With the statistical result, the user can readily understand the report. For the same reason, the hardware processor 70 may generate a report in which the gradation characteristic and the statistical result are shown as a graph or the like.

The report may be provided in any manner. For example, when two or more image forming systems 1 are connected to an external server through a network, the hardware processor 70 may generate the report in the form of an electronic file and send it to the server by means of the communicating section 15. Further, the hardware processor 70 may control the image forming device 18 to form the image of the report on a sheet so as to provide the report along with a sheet on which the image of a job is formed. Further, the hardware processor 70 may control the display 14 to display the electronic file of the report. The hardware processor 70 may be configured to be able to perform all of them.

Figure 4:
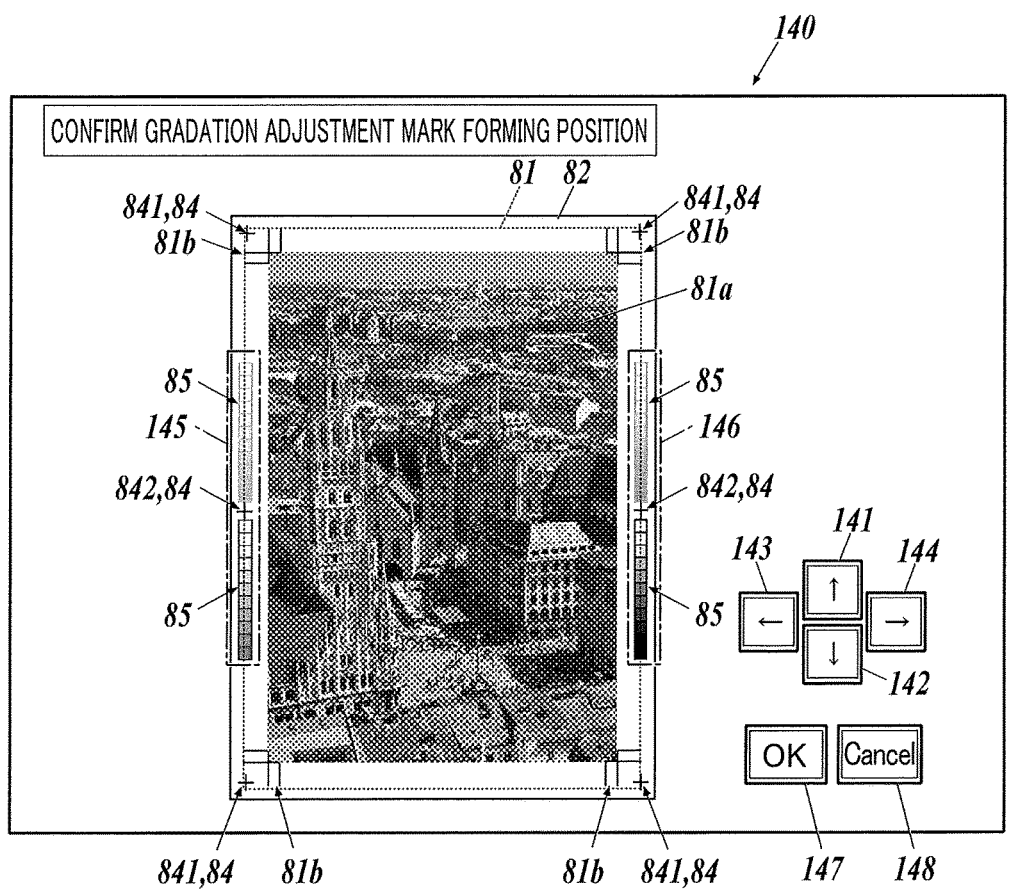
FIG. 4 illustrates an example of a display screen displayed on a display.

Next, the operation of the hardware processor 70 will be described in more detail referring to FIG. 4. FIG. illustrates a display screen 140 displayed on the display 14, which simply illustrates one side of the sheet on which the image area 81, the gradation adjustment marks 85 and the duplex alignment marks 84 are formed as well as a variety of control buttons and the like. In FIG. 4, the image area 81 is shown by the dotted line, and the forming positions 145, 146 of the gradation adjustment marks 85 are shown by the dashed-dotted lines. The dotted line and the dashed-dotted lines are actually shown on the display screen 140.

Before an image and the gradation adjustment marks 85 are formed on a sheet 80, the hardware processor 70 of this embodiment makes a determination as to whether to form the gradation adjustment marks 85 overlapping the image area 81 of the image based on image data. When it is determined to form the gradation adjustment marks 85 overlapping the image area 81, the hardware processor 70 controls the gradation adjustment mark adder 30 to add the gradation adjustment mark information to the image data.

When the size of the sheet 80 is so large relative to the size of the image area 81 that the gradation adjustment marks 85 can be formed without overlapping the image area 81, the hardware processor 70 controls the gradation adjustment mark adder 30 to add the gradation adjustment mark information without making the above-described determination.

Specifically, the hardware processor 70 makes a determination as to whether to form the gradation adjustment marks 85 overlapping the image area 81 based on a user operation on the operation device 13.

For example, when the gradation adjustment marks 85 are formed on a sheet 80, the hardware processor 70 controls the display 14 to display the display screen 140 which shows the forming position of the image area 81 and the forming positions 145, 146 of the gradation adjustment marks 85 in the sheet 80 as illustrated in FIG. 4. When the forming positions 145, 146 of the gradation adjustment marks 85 overlap the image area 81 in the display screen 140 of the display 14 as illustrated in FIG. 4, the user who checks the display screen 140 of the display 14 can visually makes a determination as to whether the gradation adjustment marks 85 can be formed overlapping the image area 81. When the forming positions 145, 146 of the gradation adjustment marks 85 do not overlap the image portion 81a as illustrated in FIG. 4, the user can press an OK button 147 on the display screen 140 through the operation device 13. In response thereto, the hardware processor 70 determines to form the gradation adjustment marks 85 overlapping the image area 81 so that the gradation adjustment marks 85 can be formed overlapping the image area 81. Instead, the user who checks the forming positions 145, 146 in the display screen 140 can press a cancel button 148 in the display screen 140 through the operation device 13. In response thereto, the hardware processor 70 determines not to form the gradation adjustment marks 85 overlapping the image area 81 so that the gradation adjustment marks 85 are not formed on the sheet 80.

The hardware processor 70 can change the forming positions 145, 146 of the gradation adjustment marks 85 in the sheet 80 based on a user operation on the operation device 13. That is, the user who check the forming positions 145, 146 in the display screen 140 can press up-down right-left arrow buttons 141 to 144 through the operation device 13 so that the hardware processor 70 changes the forming positions 145, 146 of the gradation adjustment marks 85 according to the direction of the pressed button. Further, the hardware processor 70 controls the display 14 to refresh the display screen in real time so that it simply shows the sheet 80 with the changed forming positions 145, 146 of the gradation adjustment marks 85.

As illustrated in FIG. 1, the reading apparatus 50 is disposed in the downstream in the sheet conveyance direction of the sheet finishing apparatus 60. For example, the reading apparatus 50 includes a first conveyance section 51, a second conveyance section 52, a first sensor 53, a second sensor 54, a reading section 55 and the like. When images are formed on both sides of a sheet by the image forming device 18, the reading apparatus 50 can scan both sides at the same time by means of the first sensor 53 and the second sensor 54. The result of scanning the gradation adjustment marks 85 and the duplex alignment marks 84 by the reading apparatus 50 is stored in the storage section 12 or the RAM 72 of the hardware processor 70 and is analyzed by the hardware processor 70.

The first conveyance section 51 includes a pair of upper and lower conveyance guides (not shown) that receives a sheet conveyed from the sheet finishing apparatus 60, conveyance roller pairs 511 that nip and convey the received sheet, and the like. The first conveyance section 51 conveys a sheet to the downstream at a predetermined conveyance speed. Among the conveyance roller pairs 511, the convey-ance roller pairs disposed in the upstream and the downstream of the first sensor 53 nip and convey a sheet at a predetermined nipping pressure that is higher than the nipping pressure of the other conveyance roller pairs 511. This allows stably nipping the sheet while the first sensor 53 is reading an image, and a reading error is therefore prevented.

Three conveyance roller pairs 511 are provided in the example of FIG. 1, but the number of the conveyance roller pairs 511 is not limited thereto.

The second conveyance section 52 includes a pair of upper and lower conveyance guides (not shown) that receives a sheet conveyed from the first conveyance section 51, conveyance roller pairs 521 that nip and convey the received sheet, and the like. The second conveyance section 52 conveys a sheet to the downstream at a predetermined conveyance speed. Among the conveyance roller pairs 521, the conveyance roller pairs 521 that are disposed in the upstream and the downstream of the second sensor 54 and in the upstream and the downstream of the reading section 55 nip and convey a sheet at a predetermined nipping pressure that is higher than the nipping pressure of the other conveyance roller pairs 521. This allows stably nipping a sheet while the second sensor 54 or the reading section 55 reads an image, and a reading error is therefore prevented.

Four conveyance roller pairs 521 are provided in the example of FIG. 1, but the number of the conveyance roller pairs 521 is not limited thereto.

The first sensor 53, which is disposed in the first conveyance section 51, reads the image of a sheet passing through the first conveyance section 51 from below.

For example, the first sensor 53 is constituted by an optical sensor that can read an image at relatively high speed such as a line scanner. The first sensor 53 reads the image formed on a sheet so as to output respective read signals of R, G and B colors. The first sensor 53 that is constituted by a sensor that can read an image at relatively high speed such as a line scanner can read the image formed on a sheet at a faster speed than the reading section 55 that is constituted by a colorimeter (described below). Further, the first sensor can read a wider range in the width direction of a sheet compared to the reading section 55 described below, or it can even read the full width of a sheet.

The second sensor 54, which is disposed in the second conveyance section 52, reads the image on a sheet passing though the second conveyance section 52 from above. The second sensor 54 has the same configuration as the first sensor 53.

The reading section 55, which is disposed in the downstream in the sheet conveyance direction of the second sensor 54 in the second conveyance section 52, reads the image on a sheet passing through the second conveyance section 52 from above.

The reading section 55 is constituted by a colorimeter that spectroscopically measures the color of each gradation patch of the gradation adjustment marks 85 for respective colors so as to obtain a colorimetric data. The colorimetric data includes the color of each gradation patch which is represented by a colorimetric system that is independent of the device, such as the XYZ colorimetric system. The reading section 55 has a slower reading speed and a narrower readable range in the width direction of a sheet compared to the first sensor 53 and the second sensor 54 but can obtain a more precise colorimetric data.

As illustrated in FIG. 1, the sheet finishing apparatus 60 is disposed between the image forming apparatus 10 and the reading apparatus 50. The sheet finishing apparatus 60 performs the following finishing processes on a sheet conveyed from the image forming apparatus 10. That is, the sheet finishing apparatus 60 moisturizes a sheet that is curved (e.g. rippled) due to a heating step such as the fixing step and nips the moisturized sheet from both sides while conveying it, so as to correct the curvature of the sheet. The sheet finishing apparatus 60 can also convey a sheet to the downstream without moisturizing and correcting it.

In the following, an example of the image formation processing that is executed by the hardware processor 70 in the image forming system 1 with the above-described configuration will be described referring to FIG. 5.

Figure 5:
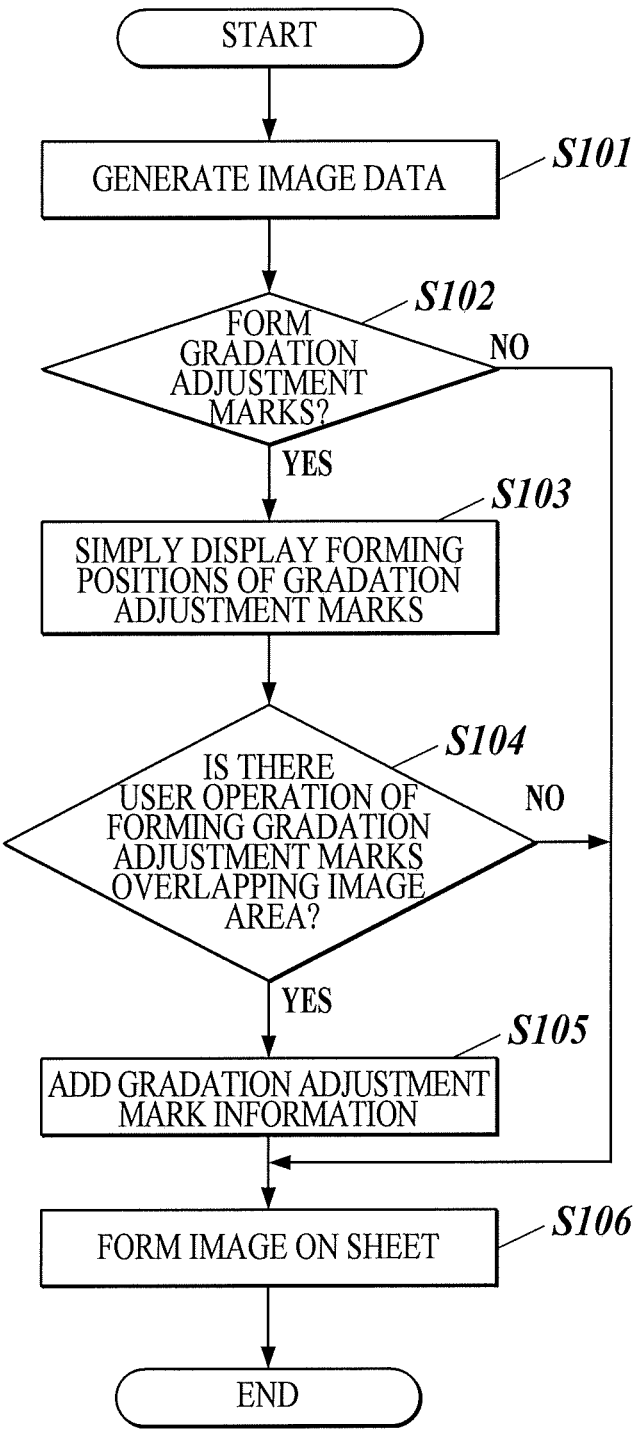
FIG. 5 is a flowchart of an example of image formation processing.

FIG. 5 is a flowchart of an example of the image formation processing performed on a sheet 80. The image formation processing of FIG. 5 may be performed either with respect to each job or with respect to each sheet tray.

First, the hardware processor 70 controls the image generating section 16 to generate the image data of an image to be formed on the sheet 80 (Step S101).

Then, the hardware processor 70 makes a determination as to whether to form the gradation adjustment marks 85 (Step S102). Specifically, the hardware processor 70 makes the determination based on whether there is an input of a user operation of forming or not forming the gradation adjustment marks 85.

If it is determined that the gradation adjustment marks 85 are formed (Step S102, Yes), the hardware processor 70 controls the display 14 to simply display the forming position of the user-required image based on the image data generated in Step S101 and the forming positions of the gradation adjustment marks 85 (Step S103). The user who checks the simply displayed forming positions of the gradation adjustment marks 85 on the display 14 can input whether to form the gradation adjustment marks 85 overlapping the image area 81 through the operation device 13. At the same time, the user can also change the forming positions of the gradation adjustment marks 85 by a predetermined operation on the operation device 13.

If it is determined that the gradation adjustment marks 85 are not formed (Step S102, No), the hardware processor 70 does not add the gradation adjustment mark information to the image data, and the processing continues with Step S106.

Then, the hardware processor 70 makes a determination as to whether there is a user operation of forming the gradation adjustment marks 85 overlapping the image area 81 (Step S104).

If it is determined that there is an operation of forming the gradation adjustment marks 85 overlapping the image area 81 (Step S104, Yes), the hardware processor 70 determines to form the gradation adjustment marks 85 overlapping the image area 81 and controls the gradation adjustment mark adder 30 to add the gradation adjustment mark information to the image data (Step S105).

If there is an operation of not forming the gradation adjustment marks 85 overlapping the image area 81, i.e. if there is no operation of forming the gradation adjustment marks 85 overlapping the image area 81 (Step S104, No), the hardware processor 70 determines not to form the gradation adjustment marks 85 overlapping the image area 81. The hardware processor 70 skips Step S105, and the processing continues with Step S106.

Finally, the hardware processor 70 controls the image forming device 18 to form the image on the sheet 80 (Step S106). The hardware processor 70 controls the reading apparatus 50 to read the formed image and performs the above-described monitoring and adjustment of the gradation characteristic based on the result of scanning the gradation adjustment marks 85.

In this way, the image formation processing is performed.

The hardware processor 70 may be configured such that when the gradation adjustment marks 85 can be formed in the non-image area 82 without overlapping the image area 81, it controls the gradation adjustment mark adder to add the gradation adjustment mark information without displaying the simplified positions on the display 14 nor making the determination based on a user operation.

In this embodiment, the image forming apparatus 10 includes the image forming device 18 that forms an image on a sheet 80 based on image data, the gradation adjustment mark adder 30 that adds the gradation adjustment mark information to the image data so that the gradation adjustment marks 85 are formed in addition to the image based on the image data, and the hardware processor 70 that monitors and adjusts the gradation characteristic based on the result of scanning the gradation adjustment marks 85 by means of the reading apparatus 50 that reads the image formed on the sheet 80. Further, the hardware processor 70 makes a determination as to whether to form the gradation adjustment marks 85 overlapping the image area 81 of the image to be formed based on the image data. If it is determined that the gradation adjustment marks 85 are formed overlapping the image area 81, the hardware processor 70 controls the gradation adjustment mark adder 30 to add the gradation adjustment mark information to the image data in the image area 81. Therefore, even when the image area 81 is large relative to the sheet 80 and the non-image area 82 is small, the gradation adjustment marks 85 can be formed. As a result, the monitoring and adjustment of the gradation characteristic can be performed at higher frequency, and correct colors can be output for a long period.

The image forming apparatus 10 further includes the operation device 13 on which the user can input an operation, and the hardware processor 70 makes the determination as to whether to form the gradation adjustment marks 85 overlapping the image area 81 based on a user operation on the operation device 13. Therefore, the gradation adjustment marks 85 can be formed overlapping the image area 81 at user's discretion.

The image forming apparatus 10 further includes the display 14 that displays the forming position of the image area 81 and the forming positions of the gradation adjustment marks 85 in the sheet 80. Therefore, the user can visually check whether the gradation adjustment marks 85 overlaps the image area 81.

The image forming apparatus 10 further includes the operation device 13 on which the user can input an operation and the display 14 that displays the forming position of the image area 81 and the forming positions of the gradation adjustment marks 85 in the sheet 80, and the hardware processor 70 changes the forming positions of the gradation adjustment marks 85 according to a user operation on the operation device 13. Therefore, the user can change the forming position of the gradation adjustment marks 85 while visually checking the forming position of the image area 81 and the forming positions of the gradation adjustment marks 85. As a result, it is possible to place the gradation adjustment marks 85 in an optimum position that is in the image area 81 excluding the image portion 81a and is readable by the reading apparatus 50.

When monitoring the gradation characteristic, the hardware processor 70 performs a control to form the gradation adjustment marks 85 with the gradation correction being active. When adjusting the gradation characteristic, it performs a control to form the gradation adjustment marks 85 with the gradation correction being inactive. In this way, the hardware processor 70 performs different image processing with respect to each sheet 80. Therefore, the monitoring and adjustment of the gradation characteristic can be performed with high accuracy.

When the hardware processor 70 forms the predetermined additional image in addition to the gradation adjustment marks 85 either in monitoring the gradation characteristic or in adjusting the gradation characteristic, the user can understand whether the gradation adjustment marks 85 on a sheet 80 is formed for monitoring the gradation characteristic or for adjusting the gradation characteristic. That is, the user can check the density both when the gradation correction is active and inactive.

When the hardware processor 70 forms the predetermined additional image in addition to the gradation adjustment marks 85 in both monitoring the gradation characteristic and adjusting the gradation characteristic but the additional image has different attribute between in monitoring the gradation characteristic and in adjusting the gradation characteristic, the same advantageous effect can be obtained.

The hardware processor 70 activates or inactivates the monitoring and adjustment of the gradation characteristic with respect to each job or each sheet tray. Therefore, the monitoring and adjustment of the gradation characteristic are performed only when an adjustment of the image density is highly required, and it is thus possible to reduce the load on the hardware processor 70.

Variation

A variation of the image forming apparatus 10 of the above-described embodiment will be described.

An image forming apparatus 10 according to the variation has basically the same configuration as the image forming apparatus 10 of the above-described embodiment except for the following point. That is, in the image forming apparatus 10 according to the variation, a hardware processor 70 analyzes image data so as to detect the area in an image area 81 where an image is actually present. Based on the detection result, the hardware processor 70 makes a determination as to whether there is a blank area in the image area 81 where an actual image is not formed and gradation adjustment marks 85 can be formed. If it is determined that there is the blank area, the hardware processor 70 controls a gradation adjustment mark adder 30 to add gradation adjustment mark information to the image data in the blank area.

The hardware processor 70 analyzes the image data so as to detect the area in the image area 81 where an image is actually present, i.e. to detect an image portion 81*a*. The detection method will be described with FIG. 6.

Figure 6:
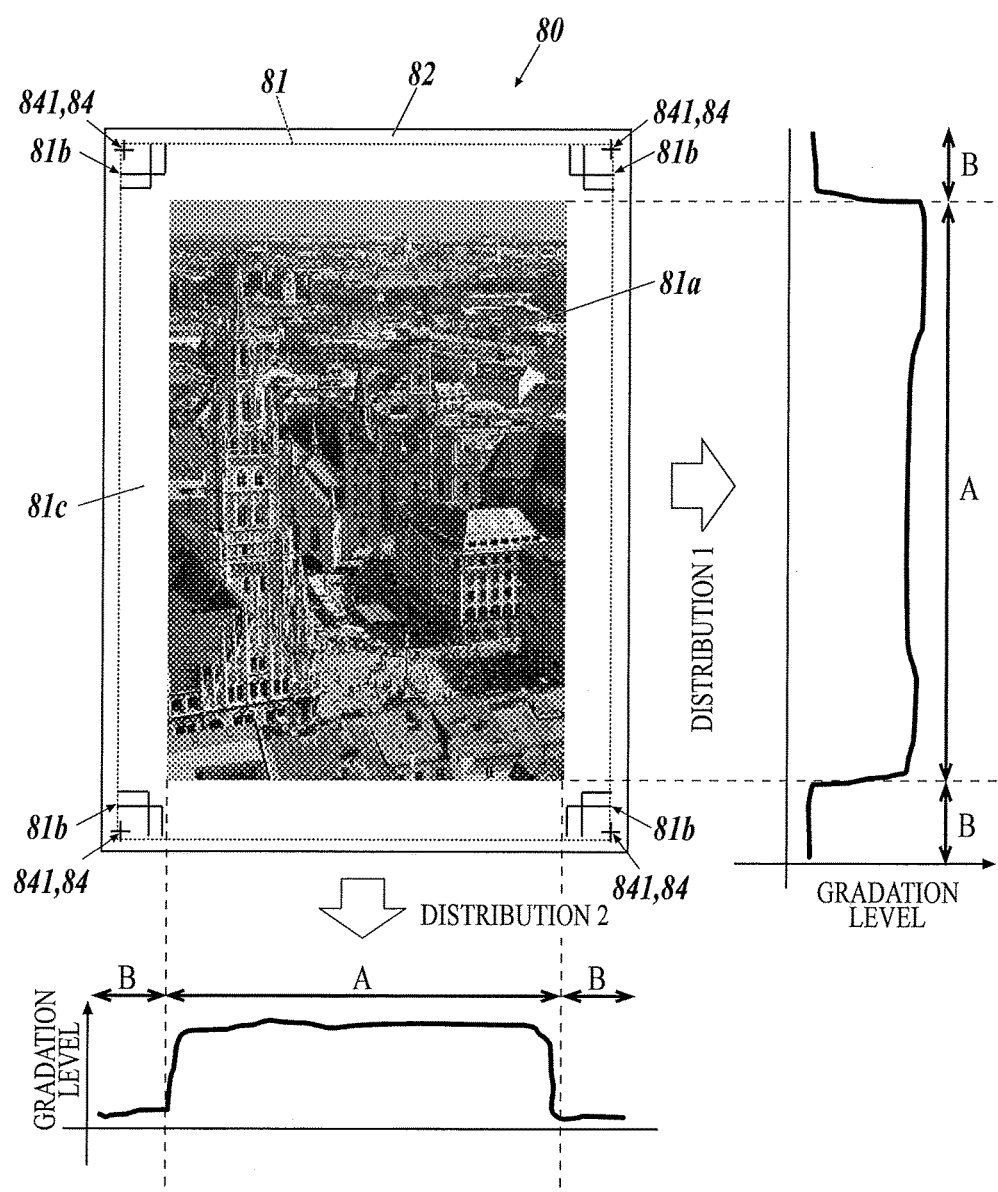
FIG. 6 illustrates one side of a sheet on which an image is formed base on image data and a distribution chart of the gradation level obtained by an analysis on the image data.

FIG. 6 illustrates one side of a sheet 80 on which the image is formed based on the image data and a distribution chart of the gradation level obtained by an analysis of the image data.

For the distribution in the longitudinal direction of the sheet 80, the hardware processor 70 divides the image data into areas in the transverse direction of the sheet 80 and calculates the total or the average of the pixel values (e.g. gradation levels) with respect to each of the divided areas. The hardware processor 70 obtains Distribution-1 of the gradation level in the longitudinal direction of the sheet 80 as illustrated in FIG. 6 from the calculated total or average values of the gradation level of the respective areas. For the distribution in the transverse direction of the sheet 80, the hardware processor 70 similarly divides the image data into areas in the longitudinal direction of the sheet 80 and calculates the total or the average of the pixel values (e.g. gradation levels) with respect to each of the divided areas. The hardware processor 70 obtains Distribution-2 of the gradation level in the transverse direction of the sheet 80 as illustrated in FIG. 6 from the calculated total or average values of the gradation level of the respective areas. The hardware processor 70 determines that an image is present in the area in the calculated distributions of the gradation level where the gradation level exceeds a predetermined threshold, i.e. the area A in FIG. 6 while no image is present in the area where the gradation level does not exceed the predetermined threshold, i.e. the area B in FIG. 6. The hardware processor 70 references the positional coordinates of the image data in the sheet 80 so as to detect the positional coordinates of the area in the image area 81 of the image data where the image is actually present, i.e. the image portion 81*a*. The hardware processor 70 compares the positional coordinates of the image area 81 with the positional coordinates of the image portion 81*a* and thereby makes a determination as to whether there is a blank area in the image area 81 where the actual image is not formed and gradation adjustment marks 85 can be formed. When the sheet 80 is trimmed after the image is formed, trim marks 81*b* are formed in the image area 81. In this case, a trimming area 81*c* (see FIG. 6) is present as the blank area where the actual image is not formed and the gradation adjustment marks 85 can be formed. If it is determined that there is the blank area, the hardware processor 70 determines to form the gradation adjustment marks 85 overlapping the image area 81. The hardware processor 70 controls the gradation adjustment mark adder 30 to add the gradation adjustment mark information to the image data in the blank area. If it is determined that there is no blank area, the hardware processor 70 determines not to form the gradation adjustment marks 85 overlapping the image area 81. The hardware processor 70 does not add gradation adjustment mark information to the image data.

An example of image formation processing that is performed by the hardware processor 70 of the image forming apparatus 10 of the variation will be described referring to FIG. 7.

Figure 7:
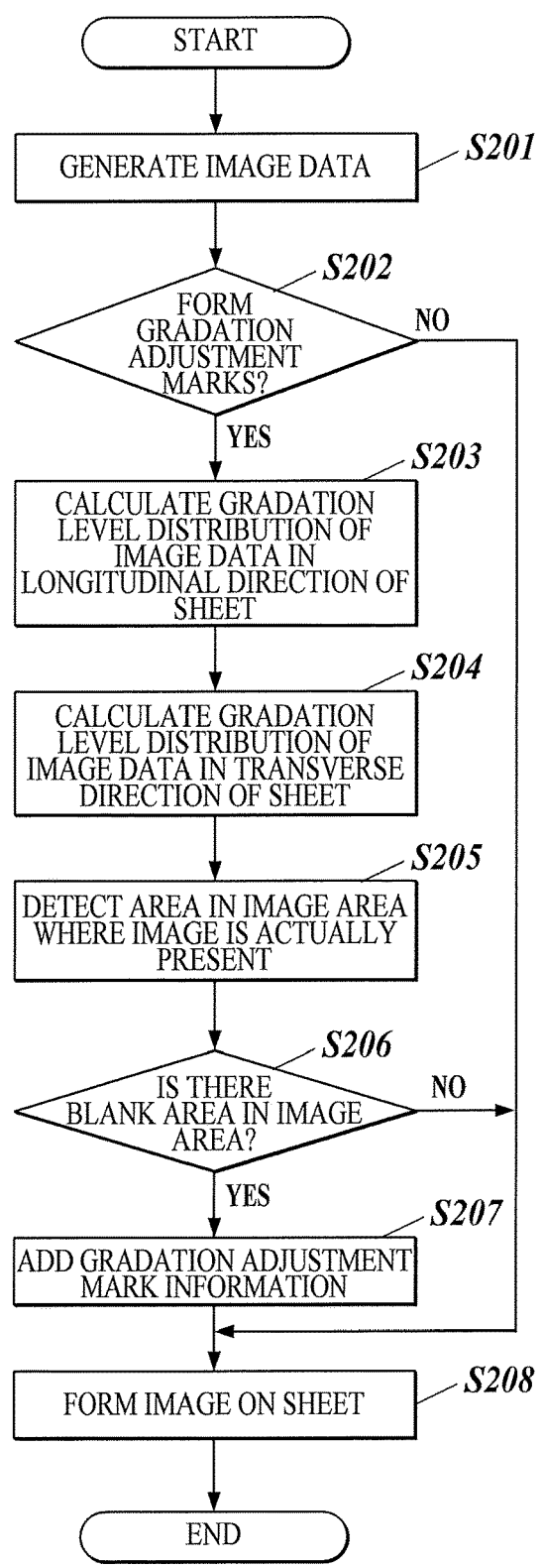
FIG. 7 is a flowchart of an example of image formation processing according to an variation.

FIG. 7 is a flowchart of an example of the image formation processing that is performed on a sheet 80. The image formation processing of FIG. 7 may be performed either with respect to each job or with respect to each sheet tray.

First, the hardware processor 70 controls the image generating section 16 to generate the image data of an image to be formed on the sheet 80 (Step S201).

Then, the hardware processor 70 makes a determination as to whether to form the gradation adjustment marks 85 (Step S202). Specifically, the hardware processor 70 makes the determination based on whether there is an input of a user operation of forming or not forming the gradation adjustment marks 85.

If it is determined that the gradation adjustment marks 85 are formed (Step S202, Yes), the hardware processor 70 calculates Distribution-1 of the gradation level of the image data in the longitudinal direction of the sheet 80 from the image data generated in Step S201 (Step S203).

If it is determined that the gradation adjustment marks 85 are not formed (Step S202, No), the hardware processor 70 does not add the gradation adjustment mark information to the image data, and the processing continues with Step S208 described below.

Then, the hardware processor 70 calculates Distribution-2 of the gradation level of the image data in the transverse direction of the sheet 80 from the image data generated in Step S201 (Step S204).

Then, the hardware processor 70 detects the area in the image area 81 of the image data where the image is actually present from Distribution-1 and Distribution-2 of the gradation level calculated in Step S203 and Step S204 (Step S205).

Then, the hardware processor 70 makes a determination as to whether there is a blank area in the image area 81 based on the result of the detection in Step S205 (Step S206).

If it is determined that there is no blank area in the image area 81 (Step S206, No), the hardware processor 70 determines not to form the gradation adjustment marks 85 overlapping the image area 81. The hardware processor skips Step S207 and does not add the gradation adjustment mark information to the image data, and the processing continues with Step S208 (described below).

If it is determined that there is the blank area in the image area 81 (Step S206, Yes), the hardware processor 70 determines to form the gradation adjustment marks 85 overlapping the image area 81. The hardware processor 70 controls the gradation adjustment mark adder 30 to add the gradation adjustment mark information to the image data (Step S207).

Finally, the hardware processor 70 forms the image on the sheet 80 (Step S208). The hardware processor 70 controls the reading apparatus 50 to read the formed image and then performs the above-described monitoring and adjustment of the gradation characteristic based on the result of scanning the gradation adjustment marks 85.

In this way, the image formation processing is performed.

To detect the area in the image area 81 where the image is actually present, the following method using the reading apparatus 50 may be employed instead. This detection method is performed after the image forming device 18 forms the image on the sheet 80 and the reading apparatus 50 reads the image.

Figure 8:
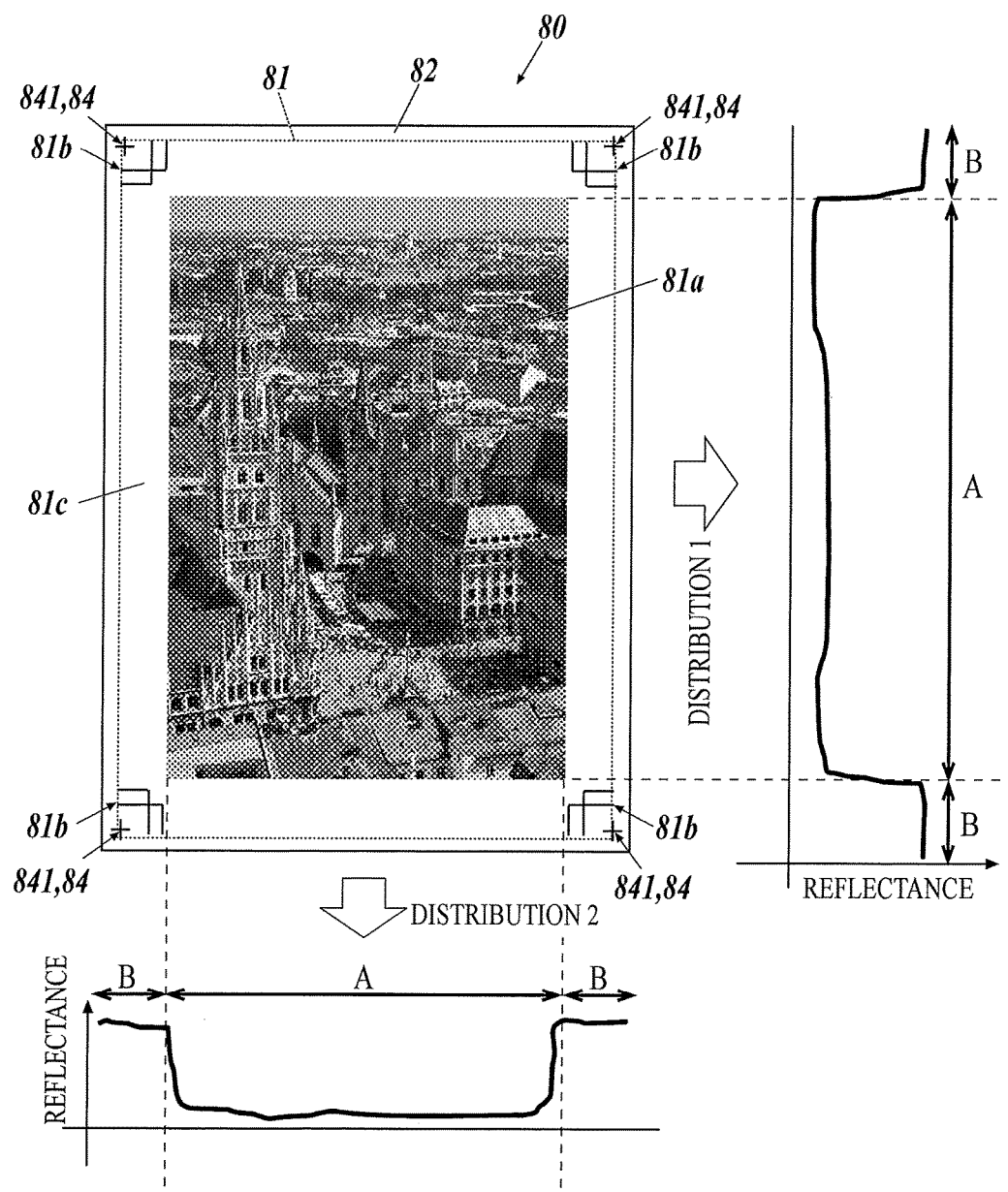
FIG. 8 illustrates one side of a sheet on which an image is formed based on image data and a distribution chart of the reflectance obtained by an analysis on the image data.

FIG. 8 illustrates one side of the sheet 80 on which the image is formed based on the image data and a distribution chart of the reflectance obtained by an analysis of the image data.

For the distribution in the longitudinal direction of the sheet 80, the hardware processor 70 controls the reading apparatus 50 to read the image formed on the sheet and then calculates the total or the average of the reflectance with respect to each of the areas of the image data divided in the transverse direction of the sheet 80. The hardware processor 70 obtains Distribution-1 of the reflectance in the longitudinal direction of the sheet 80 as illustrated in FIG. 8 from the calculated total or average of the reflectance of each area. Similarly, for the distribution in the transverse direction of the sheet 80, the hardware processor 70 controls the reading apparatus 50 to read the image formed on the sheet 80 and then calculates the total or the average of the reflectance with respect to each of the areas of the image data divided in the longitudinal direction of the sheet 80. The hardware processor 70 obtains Distribution-2 of the reflectance in the transverse direction of the sheet 80 as illustrated in FIG. 8 from the calculated total or average of the reflectance of each area. The hardware processor 70 determines that the image is present in the area in the calculated distributions of the reflectance where the reflectance does not exceed a predetermined threshold, i.e. the area A in FIG. 8, and that no image is present in the area where the reflectance exceed the predetermined threshold, i.e. the area B in FIG. 8. The hardware processor 70 references the positional coordinates of the image data on the sheet 80 so as to detect the positional coordinates of the area in the image area 81 of the image data where the image is actually present, i.e. the image portion 81a. The hardware processor 70 compares the positional coordinates of the image area 81 with the positional coordinates of the image portion 81a and thereby makes a determination as to whether there is a blank area in the image area 81 where the actual image is not formed and the gradation adjustment marks 85 can be formed. When the sheet 80 is trimmed after the image is formed, trim marks 81b are formed in the image area 81. In this case, a trimming area 81c (see FIG. 8) is formed as the blank area where the actual image is not formed and the gradation adjustment marks 85 can be formed. If it is determined that there is the blank area, the hardware processor 70 determines to form the gradation adjustment marks 85 overlapping the image area 81. The hardware processor 70 controls the gradation adjustment mark adder 30 to add the gradation adjustment mark information to the image data in the blank area. If it is determined that there is no blank area, the hardware processor 70 determines not to form the gradation adjustment marks 85 overlapping the image area 81. The hardware processor 70 does not add gradation adjustment mark information to the image data.

In the above-described variation, the hardware processor 70 analyzes the image data so as to detect the area in the image area 81 where the image is actually present. Based on the detection result, the hardware processor 70 makes a determination as to whether there is a blank area in the image area 81 where the actual image is not formed and the gradation adjustment marks 85 can be formed. If it is determined that there is the blank area, the hardware processor 70 controls the gradation adjustment mark adder 30 to add the gradation adjustment mark information to the image data in the blank area 81. Therefore, the determination as to whether to form the gradation adjustment marks 85 overlapping the image area 81 can be made without requiring any user operation. As a result, user tasks such as an operation and a check can be omitted.

When the blank area is a trimming area, a margin that is formed for trimming the sheet can be utilized for forming the gradation adjustment marks 85.

The hardware processor 70 may be configured such that when the gradation adjustment marks 85 can be formed in the non-image area 82 without overlapping the image area 81, it controls the gradation adjustment mark adder to add the gradation adjustment mark information without performing the above-described analysis of the image data nor the determination.

In this variation, since the hardware processor 70 analyzes the image data so as to make a determination as to whether to form the gradation adjustment marks 85 overlapping the image area 81, the image forming apparatus 10 does not necessarily include the operation device 13 and the display 14.

The above-described embodiment and variation are merely suitable examples of the present invention, and the present invention is not limited thereto. Suitable changes can be made without departing from the spirit of the present invention.

For example, in the above-described embodiment and variation, the image forming system 1 is configured such that the reading apparatus 50 is provided outside the image forming apparatus 10. However, the reading apparatus 50 may be provided inside the image forming apparatus 10.

In the above-described embodiment and variation, the predetermined additional image, which is different from the gradation adjustment marks 85, is formed or the attribute of the additional image is changed in either monitoring or adjusting the gradation characteristic. However, the additional image may not be formed.

In the above-described embodiment and variation, the hardware processor 70 controls the operation of the components of the image forming system 1. However, another hardware processor may be separately provided to control the operation of the reading apparatus 50 and the sheet finishing apparatus 60.

In the above-described embodiment and variation, no component is provided in the downstream in the sheet conveyance direction of the reading apparatus 50. However, for example, a sheet finishing apparatus (not shown) may be further provided which performs sheet finishing such as stapling, punching, folding and binding. Such sheet finishing by the sheet finishing apparatus is not essentially performed but is performed only when there is a command from the hardware processor 70. When there is no command from the hardware processor 70 and no sheet finishing is performed accordingly, the sheet finishing apparatus simply ejects a conveyed sheet.

In the above-described embodiment and variation, the reading apparatus 50 reads the gradation adjustment marks and the duplex alignment marks 84. However, the reading apparatus 50 may read the image and other marks formed on the sheet 80.

In the above-described embodiment and variation, the first sensor 53 reads the image on a sheet from below, and the second sensor 54 and the reading section 55 read the image on a sheet from above. On the contrary, the first sensor 53 may read the image on a sheet from above, and the second sensor 54 and the reading section 55 may read the image on a sheet from below.

In the above-described embodiment and variation, the image to be formed based on the image data includes the trim marks. However, the image may not include any trim mark. For such cases, the image forming apparatus 10 may be configured to be capable of adding trim mark information to the image data so that the trim marks are added to the trimming position of the sheet on which the image is formed based on the image data.

In the above-described embodiment and variation, a hard disk, a non-volatile semiconductor memory and the like are disclosed as examples of a computer-readable medium for the program according to the present invention. However, the present invention is not limited to these examples. Other computer-readable media, e.g. portable recording media such as a CD-ROM, are also applicable. Further, a carrier wave is also applicable as a medium for providing the data of the program according to the present invention through a communication network.

This U.S. patent application claims priority to Japanese patent application No. 2015-154694 filed on Aug. 5, 2015, the entire contents of which are incorporated by reference herein for correction of incorrect translation.

What is claimed is:

1. An image forming apparatus, comprising:
   an image forming device which forms an image on a sheet based on image data;
   a gradation adjustment mark adder which adds gradation adjustment mark information to the image data so that a gradation adjustment mark is formed in addition to the image based on the image data; and
   a hardware processor which monitors and adjusts a gradation characteristic based on a result of scanning the gradation adjustment mark, in which a scanning section which reads the image formed on the sheet scans the gradation adjustment mark,
   wherein
   the hardware processor makes a determination, based on the image data, as to whether to form the gradation adjustment mark overlapping an image area of the image or whether to form the gradation adjustment mark in a non-image area, and
   in response to determining that the gradation adjustment mark is to be formed overlapping the image area, the hardware processor controls the gradation adjustment mark adder to add the gradation adjustment mark information to the image data in the image area.

2. The image forming apparatus according to claim 1, further comprising:
   an operation device on which a user operation is input.

3. The image forming apparatus according to claim 1, further comprising:
   a display which displays a forming position of the image area and a forming position of the gradation adjustment mark in the sheet.

4. The image forming apparatus according to claim 1, further comprising:
   an operation device on which a user operation is input; and
   a display which displays a forming position of the image area and a forming position of the gradation adjustment mark in the sheet,
   wherein the hardware processor changes the forming position of the gradation adjustment mark according to the user operation on the operation device.

5. The image forming apparatus according to claim 1, wherein
   the hardware processor analyzes the image data to detect an area in the image area where the image is actually present,
   based on a result of the detection, the hardware processor makes a determination as to whether there is a blank area in the image area where the image is not formed and the gradation adjustment mark can be formed, and
   if it is determined that there is the blank area, the hardware processor controls the gradation adjustment mark adder to add the gradation adjustment mark information to the image data in the blank area.

6. The image forming apparatus according to claim 5, wherein the blank area is a trimming area.

7. The image forming apparatus according to claim 1, wherein the hardware processor performs a control to perform different image processing in each sheet such that (i) the gradation adjustment mark is formed with gradation correction being active when monitoring the gradation characteristic, and (ii) the gradation adjustment mark is formed with gradation correction being inactive when adjusting the gradation characteristic.

8. The image forming apparatus according to claim 1, wherein the hardware processor forms a predetermined additional image in addition to the gradation adjustment mark in either monitoring the gradation characteristic or adjusting the gradation characteristic.

9. The image forming apparatus according to claim 1, wherein
   the hardware processor forms a predetermined additional image in addition to the gradation adjustment mark in both monitoring the gradation characteristic and adjusting the gradation characteristic, and an attribute of the additional image differs between in monitoring the gradation characteristic and in adjusting the gradation characteristic.

10. The image forming apparatus according to claim 1, wherein the hardware processor activates or inactivates the monitoring and adjustment of the gradation characteristic with respect to each job or each sheet tray.

11. A non-transitory computer readable medium storing a program which makes a computer of an image forming apparatus for forming an image on a sheet based on image data function as:
   a gradation adjustment mark adder which adds gradation adjustment mark information to the image data so that a gradation adjustment mark is formed in addition to the image based on the image data; and
   a hardware processor which monitors and adjusts a gradation characteristic based on a result of scanning the gradation adjustment mark, in which a scanning section which reads the image formed on the sheet scans the gradation adjustment mark,
   wherein
   the hardware processor makes a determination, based on the image data, as to whether to form the gradation adjustment mark overlapping an image area of the image or whether to form the gradation adjustment mark in a non-image area, and
   in response to determining that the gradation adjustment mark is to be formed overlapping the image area, the hardware processor controls the gradation adjustment mark adder to add the gradation adjustment mark information to the image data in the image.

12. The image forming apparatus according to claim 1, wherein gradation adjustment marks are formed in both ends of the sheet in the direction perpendicular to a conveyance direction of the sheet.

* * * * *